Figure 1:
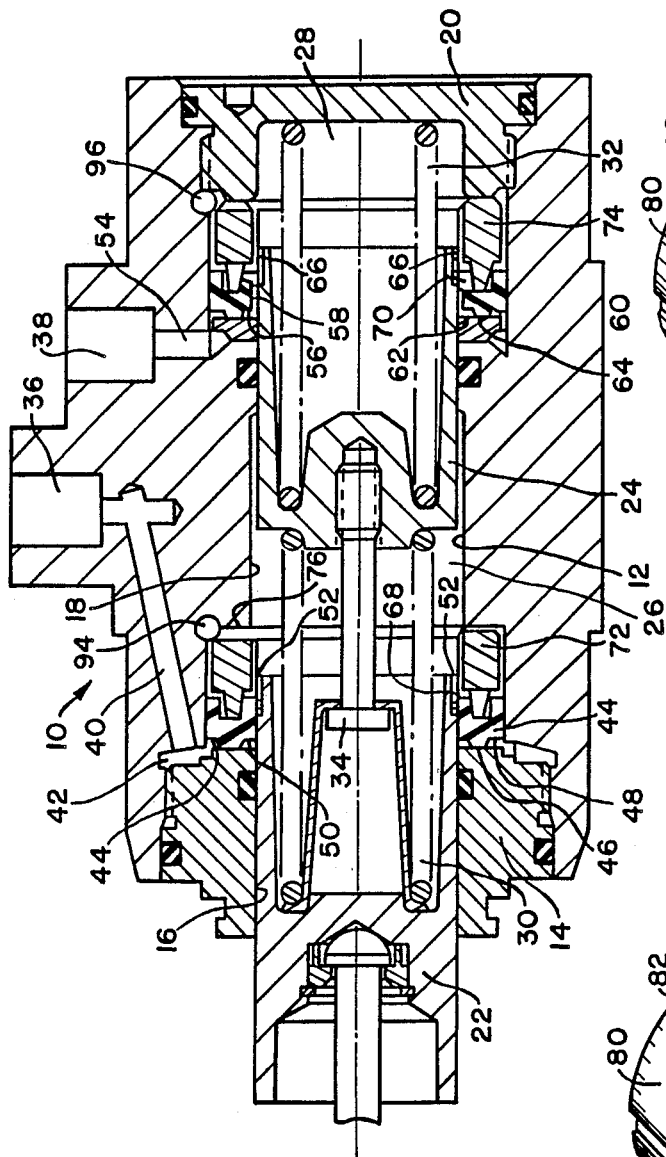

United States Patent [19]

Bacardit

[11] Patent Number: 4,964,274
[45] Date of Patent: Oct. 23, 1990

[54] HYDRAULIC PRESSURE GENERATOR

[75] Inventor: Juan S. Bacardit, Barcelona, Spain

[73] Assignee: Bendix Espana, Barcelona, Spain

[21] Appl. No.: 259,645

[22] Filed: Oct. 19, 1988

[30] Foreign Application Priority Data

Oct. 19, 1987 [EP] European Pat. Off. ........ 87500066.3

[51] Int. Cl.$^5$ .......................... B60T 11/26; F15B 7/10
[52] U.S. Cl. ...................... 60/588; 60/585; 277/193
[58] Field of Search ............... 60/588, 585, 588, 562; 92/162 R, 107, 130 R, 81, 86.5; 277/123, 124, 125, 110, 112, 102, 193

[56] References Cited

U.S. PATENT DOCUMENTS

| | | | |
|---|---|---|---|
| 3,141,303 | 7/1964 | Baldwin | 60/588 |
| 3,147,596 | 9/1964 | Wallace | 60/54.6 |
| 4,348,866 | 9/1982 | Hayashida | 60/588 |
| 4,455,830 | 6/1984 | Gaiser et al. | 60/588 |
| 4,474,005 | 10/1984 | Steer | 60/585 |
| 4,510,752 | 4/1985 | Gaiser | 60/562 |
| 4,527,395 | 7/1985 | Gaiger et al. | 60/562 |
| 4,628,691 | 12/1986 | Hachiro | 60/558 |
| 4,685,301 | 8/1987 | Bacardit et al. | 60/562 |
| 4,702,078 | 10/1987 | Briggs et al. | 60/585 |
| 4,706,970 | 11/1987 | Ramirez | 277/124 |
| 4,783,128 | 11/1988 | Resch | 60/562 |

FOREIGN PATENT DOCUMENTS

| | | | |
|---|---|---|---|
| 0030197 | 6/1981 | European Pat. Off. | 60/588 |
| 0162772 | 11/1986 | European Pat. Off. | |
| 816790 | 8/1951 | Fed. Rep. of Germany . | |
| 2026756 | 12/1970 | Fed. Rep. of Germany | 60/585 |
| 2005456 | 8/1971 | Fed. Rep. of Germany | 60/588 |
| 2459746 | 2/1981 | France | 60/588 |
| 0160643 | 12/1980 | Japan | 60/588 |
| 0033564 | 2/1983 | Japan | 60/588 |
| 1009261 | 11/1965 | United Kingdom | 60/588 |
| 2051271 | 1/1981 | United Kingdom . | |

Primary Examiner—Edward K. Look
Assistant Examiner—Thomas Denion
Attorney, Agent, or Firm—Larry J. Palguta; Ken C. Decker

[57] ABSTRACT

A hydraulic pressure generator comprises a body in which is formed a bore, at least one piston mounted slidably in the bore, an annular sealing mechanism located in the bore, and the piston being slidable from a rest position during operation of the generator to cooperate with the sealing mechanism and divide the bore into a working chamber connectable by an output passage to a hydraulic actuator. A refill passage is connected to a source of hydraulic fluid. The output passage is formed in part between a first surface fixed in the bore and a second surface formed on a member mounted in the bore.

8 Claims, 1 Drawing Sheet

HYDRAULIC PRESSURE GENERATOR

The present invention relates to a hydraulic pressure generator and, more particularly, to such a pressure generator for use in a hydraulic circuit of a vehicle. Examples of such pressure generators are the master-cylinders for a vehicle brake or clutch circuit.

An example of such a pressure generator is described in EP-A-O No. 030 197. This document relates to a single master-cylinder having an annular seal adapted to control the return passage between the working chamber and the reservoir. This device, however, suffered from the drawback that the interior surface of the bore was complicated to machine resulting in high manufacturing costs. Furthermore, the internal structure of the master-cylinder necessitated the location of the output connection to the brakes at a considerable distance from the rest position of the actuator piston. This resulted in the master-cylinder being undesirably long and heavy.

It is therefore an object of the present invention to provide a hydraulic pressure generator of simple construction and in which the axial length is minimized.

According to the invention there is provided a hydraulic pressure generator comprising a body in which is formed a bore, at least one piston slideably mounted in the bore, annular sealing means located in the bore, the piston slideable, from a rest position, during operation of the generator to cooperate with the sealing means to divide the bore into a working chamber connectable by an output passage to a hydraulic actuator, and a refill passage connectable to a source of hydraulic fluid, characterized in that the output passage is formed in part between a first surface fixed in the bore and a second surface formed on a member mounted in the bore.

Figure 3:
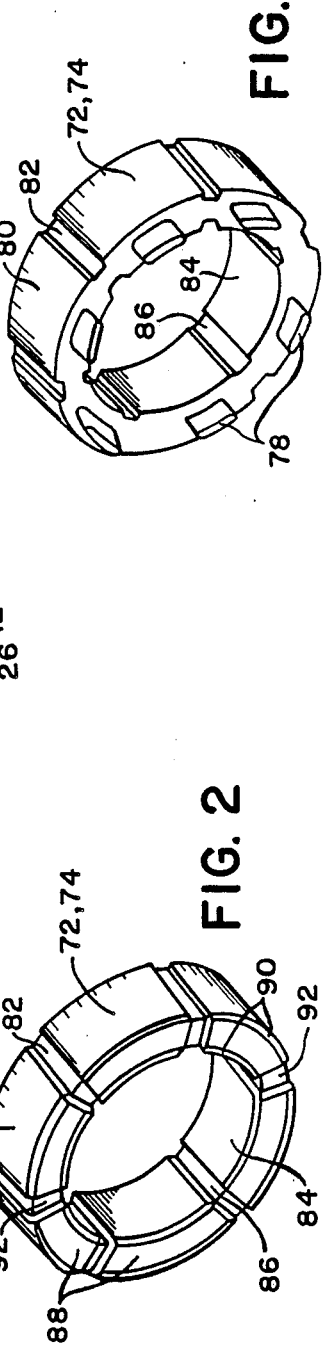
Figure 2:
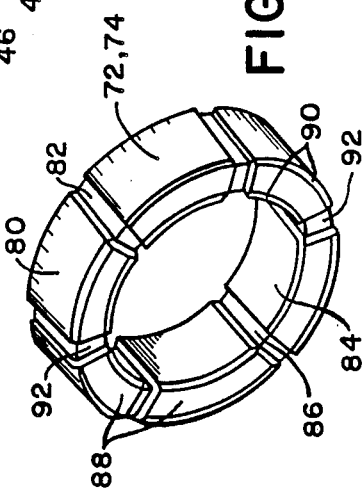

The present invention will now be described by way of example with reference to the accompanying drawings, in which:

FIG. 1 is a longitudinal section through a hydraulic pressure generator according to the invention, and FIGS. 2 and 3 are each an opposed perspective view of a component of FIG. 1.

As shown in FIG. 1 the hydraulic pressure generator, which, in the illustrated example, is a master-cylinder of the tandem type for a vehicle braking circuit, comprises a body 10 in which is formed a longitudinal stepped bore 12. In one end of the stepped bore 12 is mounted a closure ring 14 having a central opening 16 which is coextensive with a central part 18 of the stepped bore 12. The other end of bore 12 is closed by a threaded closure member 20.

A primary and a secondary piston 22, 24 are slideably and sealingly mounted in the bore 12, a primary working chamber 26 being defined between the two pistons 22 and 24, and a secondary working chamber 28 being defined between the secondary piston 24 and the closure member 20. The primary and secondary pistons 22 and 24 are urged towards their illustrated rest positions by springs 30 and 32, the separation between the two pistons being limited by a lost-motion coupling 34.

The master-cylinder is intended to be connected to a reservoir of hydraulic fluid (not shown) by two threaded connections 36 and 38 each associated with a respective working chamber 26 and 28. Connection 36 communicates with the primary working chamber 26 by a passage 40 which opens into a region 42 of the stepped bore 12 adjacent the closure ring 14. An annular seal 44 having a generally "C"-shaped cross-section is mounted in the stepped bore 12 adjacent the closure ring 14. The radial rear surface of the seal 44 is formed with numerous, spaced hemispherical projections 46 which keep the seal spaced a slight distance from the adjacent radial face 48 of the closure ring 14. A fluid passage 50 is thus formed between the radial face 48 and radial surface of closure ring 14.

The outer surface of piston 22 is formed, at its end adjacent the working chamber 26, with longitudinal grooves 52 which, when the piston 22 is in its illustrated rest position, allow replenishment fluid communication between the primary working chamber 26 and the reservoir connection 36 by way of fluid passages 50 and 40. A similar refill or replenishment passage for the secondary working chamber 28 is formed by reservoir connection 38, a passage 54, and a passage 56 formed between a similar seal 58 having spaced projections 60 and an adjacent radial face 62 of a ring 64. In a manner similar to that for the primary piston 22, the secondary piston 24 has longitudinally extending spaced grooves 66 on its outer surface which, when the piston 24 is in its illustrated rest position allows replenishment fluid communication between the secondary working chamber 28 and the reservoir connection 38 by way of fluid passages 54 and 56.

Each of the seals 44 and 58 has an internally projecting radial lip 68, 70 respectively, which is adapted to sealingly engage the associated piston 22, 24 when the pistons are displaced during operation of the master-cylinder.

In accordance with the invention the master-cylinder comprises two spacer rings 72, 74 located in the stepped bore 12, one adjacent each of the working chambers 26 and 28. In the present example the two spacer rings 72, 74 are closely similar and FIGS. 2 and 3 can be considered as perspective opposing views of either ring.

Spacer ring 72 is mounted in stepped bore 12 and retained against a radial shoulder 76 by the action of seal 44 which is tightly urged against the ring 72 by closure ring 14 which is screwed into the body 10. In a similar way, spacer ring 74 is mounted in stepped bore 14 and retained between seal 58, which itself closely abuts ring 64, and closure member 20 which is screwed into the body 10. As shown in FIG. 3, each spacer ring 72, 74 has a number of spaced, finger-like projections 78 which engage the radial inner surface of the adjacent seal 44, 58. The outer surface 80 of the ring is formed with a number of longitudinally extending grooves 82 which, when the ring is mounted in the bore 12 form fluid passages between the ring and the surface of the bore 12. The inner surface 84 of the ring is similarly formed with a number of longitudinally extending grooves 86 which, when the ring is mounted in the bore 12 and the device is operated, allow fluid passage between the inner surface 84 and the outer surface of the piston 22, 24. The face of the ring 72, 74 shown in FIG. 2 is formed with a number of radially extending projections 88 having bevelled edges 90. Radial grooves 92 are defined between the projections 88 which form fluid passages 90 between ring 72 and radial shoulder 76 and between ring 74 and closure member 20 when the spacer rings are located in the bore 12.

The master-cylinder further comprises two output passages 94 and 96 one associated with each of the working chambers 26 and 28. Each output passage 94, 96 is in communication with a respective threaded connection (not shown) which, in use, are each connected to an associated braking circuit of the vehicle. In accordance with the invention each output passage 94, 96 is located closely adjacent the end of the associated piston 22, 24 when this is in its rest position. This enables the master-cylinder to be shorter than is possible with devices of a more conventional design. Fluid communication between the working chambers 26, 28 and the output passages 94, 96 is assured even when the pistons are in their most forward position because the grooves 52 and 66 on the pistons 22 and 24 are always in fluid communication with the radial grooves 92.

In the illustrated rest position the working chamber 26 is in communication with the reservoir by way of passages 40, 50 and grooves 52. Similarly, working chamber 28 communicates with the reservoir by way of passages 54, 56 and grooves 66. When the master-cylinder is operated the pistons 22, 24 advance and engage the radial lip 68, 70 of the respective seal 44, 58 thus isolating the working chambers 26, 28 from the reservoir. Fluid under pressure is sent from the working chambers 26, 28 to the brakes of the vehicle by way of radial grooves 92 and grooves 52, 66 to output passages 94 and 96. Upon termination of braking the pistons 22 and 24 return towards their rest positions under the effect of springs 30 and 32. Each returning positions creates a drop in pressure in the working chamber which creates a pressure differential across the seal. The radially outer lip of the seal disengages itself from the surface of the bore 12 and allows fluid to flow from the reservoir to the working chamber.

Thus it will be seen that, in accordance with the invention, it is possible to locate the output passage closely adjacent the associated piston thus allowing a considerable reduction in the length of the master-cylinder. It is envisaged that, for economic manufacture, the spacer rings 72, 74 be made from sintered material.

It is further envisaged that the present invention could be applied to single master-cylinders, for example those used for operating the clutch of a vehicle. It is a further advantage of the invention that the internal machining of the bore 12 is kept to a minimum thus reducing manufacturing costs.

What is claimed:

1. A hydraulic pressure generator comprising a body in which is formed a bore, at least one piston slideably mounted in the bore, annular sealing means located in the bore, the piston slideable, from a rest position, during operation of the generator to cooperate with the sealing means to divide the bore into a working chamber connectable by an output passage to a hydraulic actuator, and a refill passage connectable to a source of hydraulic fluid, the output passage being formed in part between a first surface fixed in the bore and a second surface formed on a short axial length ring mounted in the bore in the working chamber, an inner surface of the ring being dimensioned to receive the piston when the piston moves from the rest position, wherein the output passage opens into the bore adjacent the piston when the piston is in the rest position.

2. The generator as claimed in claim 1, characterized in that the ring comprises a plurality of projections on the second surface which cooperate with the first surface, to define the output passage.

3. The generator as claimed in claim 2, characterized in that the ring is mounted adjacent the sealing means and comprises at least one projection which engages and retains the sealing means.

4. The generator as claimed in claim 3, characterized in that the ring comprises at least one passage formed in an outer surface, the one passage defining a fluid path between the ring and the bore.

5. The generator as claimed in claim 4, characterized in that the ring comprises at least one inner passage formed in the inner surface, the inner passage defining a fluid path between the ring and the piston when the piston is moved from the rest position.

6. The generator as claimed in claim 3, characterized in that the sealing means has a generally "C"-shaped cross-section, the projection being dimensioned to allow an outer lip of the sealing means to be displaced from a position in which a fluid passage is formed between the sealing means and the bore.

7. The generator as claimed in claim 6, characterized in that the generator comprises two pistons, each slideably mounted in the bore, each piston having an associated working chamber, one working chamber being defined in the bore between the two pistons, each working chamber having an associated output passage formed in part between a first surface fixed in the bore and a second surface formed on an associated ring mounted in the bore.

8. The generator as claimed in claim 2, characterized in that the ring is formed of sintered material.

* * * * *